UNITED STATES PATENT OFFICE.

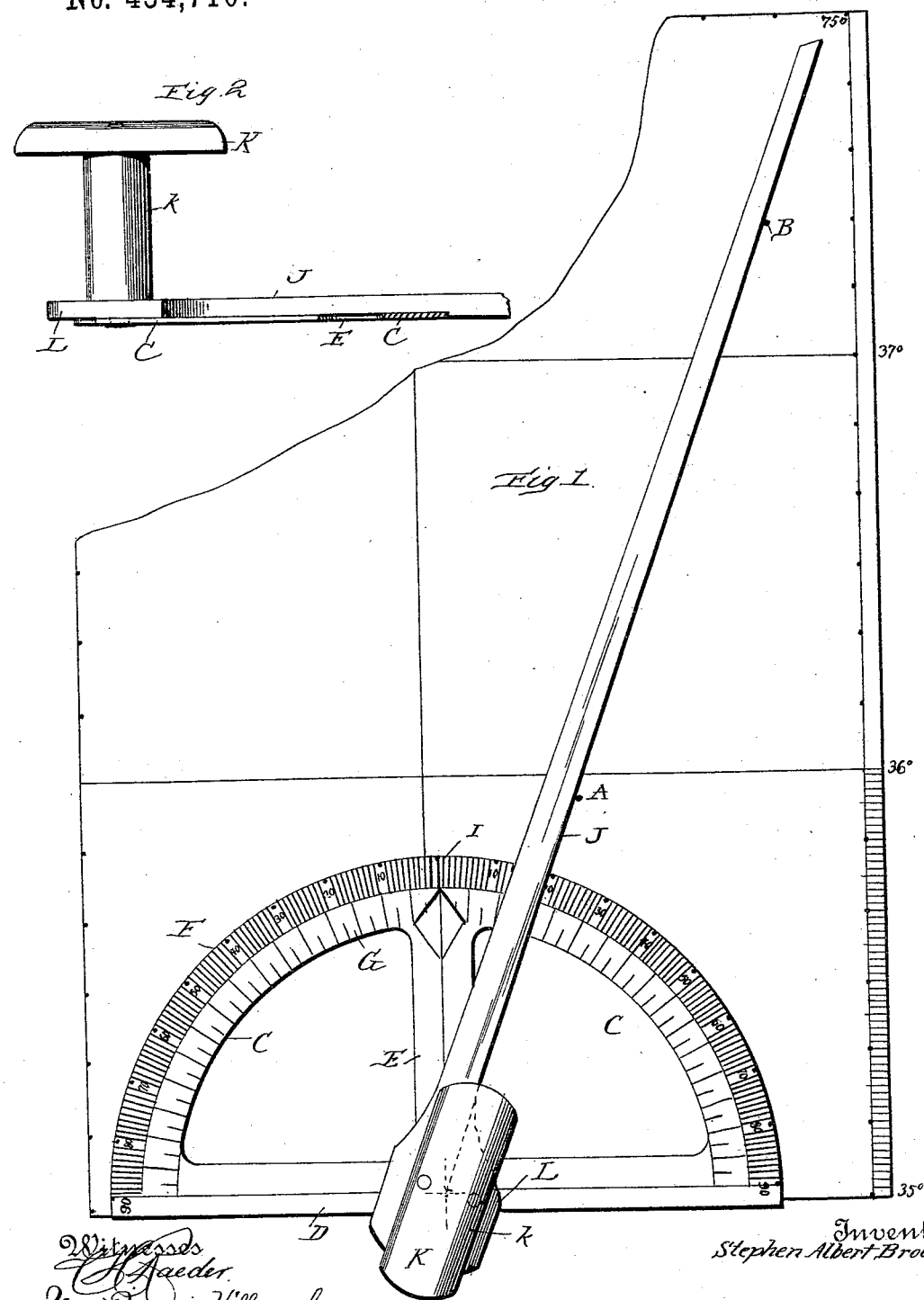

STEPHEN ALBERT BROWN, OF FORT CUSTER, MONTANA.

PROTRACTOR.

SPECIFICATION forming part of Letters Patent No. 454,710, dated June 23, 1891.

Application filed September 4, 1889. Serial No. 322,927. (No model.)

*To all whom it may concern:*

Be it known that I, STEPHEN ALBERT BROWN, a citizen of the United States, residing at Fort Custer, in the county of Custer and Territory of Montana, have invented certain new and useful Improvements in Combined Rules and Compasses; and I do declare the following to be a full, clear, and exact description of the invention, such as will enable others skilled in the art to which it appertains to make and use the same, reference being had to the accompanying drawings, and to the letters of reference marked thereon, which form a part of this specification.

This invention relates to a combined rule and compass for finding the course-bearing and cross-bearings between any two places upon a chart, map, or atlas.

The object of the invention is to facilitate and curtail the task of masters, officers, and mariners at sea when mapping out the vessel's course.

The improvement consists of the novel features which will be hereinafter more fully described and claimed, and which are shown in the accompanying drawings, in which—

Figure 1 is a top plan view showing the application of my invention. Fig. 2 is a side view, parts being broken away, of the invention.

The frame C is semicircular and united at its ends by the bar D and strengthened between its ends by the radial brace E, and is provided with two sets of graduations F and G. The graduations F indicate degrees and extend to the right and the left from a point midway of the ends of the frame, the 0 being at the said central point of the frame and the graduations extending ninety degrees each way to the ends of the frame. There is a dot at each ten (10) degrees, the small strokes representing single degrees. The graduations G are divided into points, halves and quarters of points corresponding with the mariner's compass, and extend from ninety degrees left to ninety degrees right.

The rule or needle J is pivoted at its inner end to the frame C, concentric with the center thereof, and its outer end projects beyond the frame the required distance. The right-hand edge of the rule or needle is coincident with a radius of the frame to within a short distance of the inner end of the said rule or needle, which end is widened or extended on each side of the pivotal connection between the needle or rule and the frame to enable the standard $k$ to obtain a firm purchase on the said inner end of the needle or rule and have its axis coincident with the pivotal center of the same. This standard $k$ is provided at its upper end with the handle K, by means of which the rule or needle is turned to the right or the left, as required. The under side of the rule or needle directly opposite the frame is cut away about the thickness of the said frame to permit the front portion of the rule to rest squarely on the map or chart.

This compass must always be read from the diamond spear or 0, as shown in Fig. 1, using the right side of the needle always. A line parallel with the rear edge of the frame and passing through the center of the frame and through ninety degrees of the graduations I is the true base-line from which all the calculations must be made. A line passing through the 0 of the graduations I and through the center of the frame corresponds with the position of the needle in the mariner's compass, and may be termed the "meridian line."

On the chart or map the place of the observer is represented by A, and the place required by B. When the base-line is placed upon some parallel preceding of place A and in such a manner as to allow the right edge of the needle to cut both places A and B at the same time, the course is at once seen either in degrees or points, halves and quarters of points of the compass. In some cases, where the course is required between two parallels and not near either of the graduated parallels, place the said meridian line of the compass upon some meridian near place A and in such manner that the right edge of the needle or ruler will cut both places A and B at the same time, as before, when the course will be indicated.

I claim—

The hereinbefore-specified combined rule and compass, composed of the semicircular frame C, united at its ends by the cross-bar D and strengthened intermediate of its ends by the radial brace E, and having two separate sets of graduations near its peripheral edge arranged in parallel position, one set indicating degrees and counting from the center of the frame toward each end, and the other set representing the points of the compass and extending from ninety degrees left to ninety degrees right, the pointer pivoted to the frame concentric with the center thereof and having one edge coincident with a radius of the frame, the pointer being extended beyond the frame and having its under side opposite the frame cut away the thickness of the frame, the standard $k$, projected up from the pointer in line with its pivotal connection with the frame, and the cross-handle on the upper end of the said standard, substantially as described, and for the purpose specified.

In testimony whereof I affix my signature in presence of two witnesses.

STEPHEN ALBERT BROWN.

Witnesses:
JOHN W. THWEAT,
E. A. RICHARDSON.